US009759347B2

United States Patent
Elliott

(10) Patent No.: US 9,759,347 B2
(45) Date of Patent: Sep. 12, 2017

(54) CHOKE VALVE WITH FLOW-IMPEDING RECESSES

(75) Inventor: Declan Elliott, Newtonforbes (IE)

(73) Assignee: Cameron International Corporation, Houston, TX (US)

( * ) Notice: Subject to any disclaimer, the term of this patent is extended or adjusted under 35 U.S.C. 154(b) by 1758 days.

(21) Appl. No.: 12/992,257

(22) PCT Filed: May 11, 2009

(86) PCT No.: PCT/IB2009/051934
§ 371 (c)(1),
(2), (4) Date: Nov. 11, 2010

(87) PCT Pub. No.: WO2009/156878
PCT Pub. Date: Dec. 30, 2009

(65) Prior Publication Data
US 2011/0094607 A1    Apr. 28, 2011

Related U.S. Application Data

(60) Provisional application No. 61/076,595, filed on Jun. 27, 2008.

(51) Int. Cl.
*F16K 47/08* (2006.01)

(52) U.S. Cl.
CPC ......... *F16K 47/08* (2013.01); *Y10T 137/7837* (2015.04)

(58) Field of Classification Search
USPC ....................................... 251/127; 137/625.3
See application file for complete search history.

(56) References Cited

U.S. PATENT DOCUMENTS

| | | | | |
|---|---|---|---|---|
| 3,252,480 | A | * | 5/1966 | Odendahl et al. ......... 137/625.3 |
| 3,954,124 | A | * | 5/1976 | Self .................................. 138/42 |
| 3,971,411 | A | | 7/1976 | Baumann |
| 4,024,891 | A | * | 5/1977 | Engel et al. ................ 137/625.3 |
| 4,549,718 | A | * | 10/1985 | Seger .................................. 251/121 |
| 4,617,963 | A | * | 10/1986 | Stares ......................... 137/625.3 |
| 5,014,746 | A | * | 5/1991 | Heymann ................... 137/625.3 |
| 5,803,119 | A | * | 9/1998 | Steinke .................... 137/625.37 |
| 6,536,472 | B2 | | 3/2003 | Baumann |

(Continued)

FOREIGN PATENT DOCUMENTS

EP    0461600    12/1991

OTHER PUBLICATIONS

Written Opinion for Singapore Application No. 201008489-5, mailed on Oct. 6, 2011; 9 pages.

(Continued)

*Primary Examiner* — Matthew W Jellett
(74) *Attorney, Agent, or Firm* — Fletcher Yoder, P.C.

(57) ABSTRACT

Disclosed is a device that includes a choke valve. The choke valve may include a generally tubular throttling member having a sealing shoulder disposed in an inner volume of the throttling member, a plurality of openings configured to flow a fluid between the inner volume of the throttling member and an outer volume of the throttling member, and a flow-impeding recess disposed between the sealing should and the plurality of openings in the inner volume of the throttling member. The choke valve may also include a valve member disposed at least partially in the inner volume of the throttling member.

22 Claims, 10 Drawing Sheets

(56) References Cited

U.S. PATENT DOCUMENTS

| | | |
|---|---|---|
| 6,637,452 B1 | 10/2003 | Alman |
| 2002/0162591 A1 | 11/2002 | Baumann |
| 2004/0050433 A1* | 3/2004 | Nawaz .................... 137/625.39 |

OTHER PUBLICATIONS

PCT International Search Report and Written Opinion for PCT/IB2009/051934, mailed on Sep. 3, 2009; 12 pages.

* cited by examiner

CHOKE VALVE WITH FLOW-IMPEDING RECESSES

CROSS-REFERENCE TO RELATED APPLICATIONS

This application claims priority to and benefit of PCT Patent Application No. PCT/IB2009/051934, entitled "Choke Valve with Flow-Impeding Recesses," filed May 11, 2009, which is herein incorporated by reference in its entirety, and which claims priority to and benefit of U.S. Provisional Patent Application No. 61/076,595, entitled "Choke Valve with Flow-Impeding Recesses", filed on Jun. 27, 2008, which is herein incorporated by reference in its entirety.

FIELD OF THE INVENTION

Embodiments of the present invention relate generally to valves. More particularly, some embodiments of the present invention relate to choke valves.

BACKGROUND

This section is intended to introduce the reader to various aspects of art that may be related to various aspects of the present invention, which are described or claimed below. This discussion is believed to be helpful in providing the reader with background information to facilitate a better understanding of the various aspects of the present invention. Accordingly, it should be understood that these statements are to be read in this light, and not as admissions of prior art.

In many fluid-handling systems, it is useful to adjust a fluid's flow rate. Often, fluids (e.g., a liquid, a gas, or combination thereof) enter the system at a relatively high pressure before flowing to lower pressure regions of the system. The flow rate driven by the resulting pressure drop may be greater than desired. High flow rates may erode components, generate unpleasant noise, and deliver greater volumes of fluid than downstream components are equipped to optimally process.

To adjust flow rates, many fluid-handling systems include choke valves. These valves typically include a movable valve member that translates over an opening through which the fluid flows. By shifting the position of the valve member relative to the opening, the size of the opening may be increased or decreased, and the flow rate of the fluid may be adjusted. In some types of choke valves, the valve member can close the opening and seal against a seat, thereby dropping the flow rate to zero or near zero and closing the choke valve.

Many conventional choke valves are difficult to control when they are near the closed position, e.g., within the last 5 to 10 percent of the valve member's travel. As the valve member opens from the closed position, fluid flow often increases relatively rapidly as an initial gap is formed. As the opening grows, the rate of change in the flow rate stabilizes, and flow is more easily controlled by adjusting the position of the valve member. The initial jump in the flow rate, however, makes controlling low flow rates difficult, as relatively small changes in the position of the valve member may have a relatively large impact on the flow rate. Choke valves are characterized by the range of flow rates over which they are controllable. This property is referred to as "rangeability." The rapid increase in flow rate as the valve member is initially opened decreases rangeability, as deviations in the position of the valve member may produce relatively large shifts in the flow rate.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof.

Figure 1:
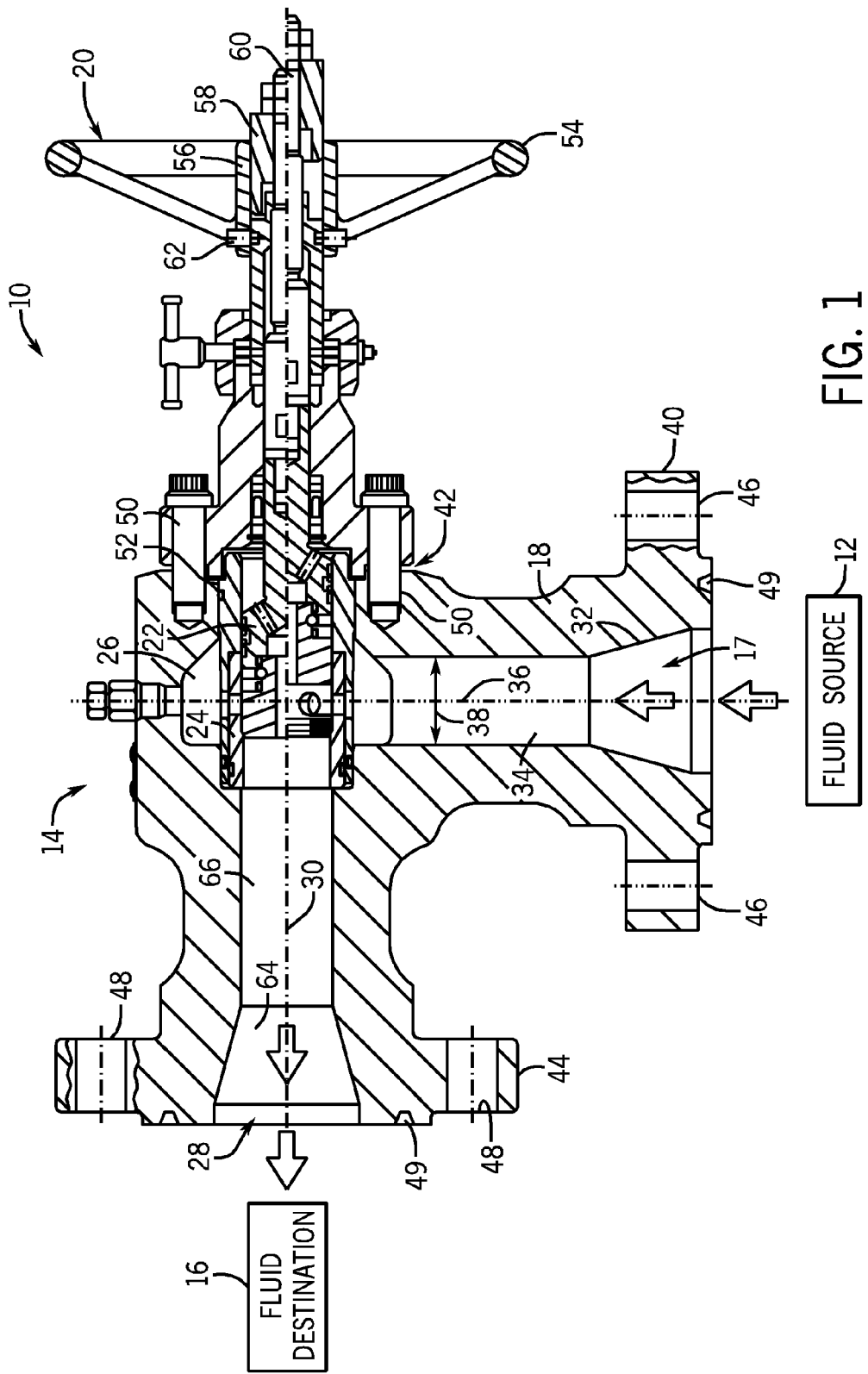
FIG. 1 illustrates an embodiment of a fluid-handling system.

FIG. 1 illustrates an embodiment of a fluid-handling system 10. The fluid-handling system 10 may be part of an energy-acquisition or processing system, e.g., a hydrocarbon-production or processing system, such as a subsea or surface oil or gas well, a pipeline, a natural-gas processing terminal, a refinery, or a natural-gas powered electrical plant. In some embodiments, the fluid-handling system 10 may be a gas-uplift system, a water-injection system, a water/steam/chemicals injection system, or other system for conveying fluids.

The fluid-handling system 10 includes a fluid source 12, a choke valve 14, and a fluid destination 16. The fluid source 12 may include a variety of fluid sources, such as an oil or natural gas well, a pipeline, a tanker, an upstream choke valve, or upstream components of a processing plant. The fluid source 12 may supply a variety of fluids, such as air, natural gas, oil, water (steam or liquid), or combinations thereof. The fluid arriving from the source 12 may be at relatively high pressures, e.g., pressures greater than 500 psi, 1000 psi, 5000 psi, or 10,000 psi.

The choke valve 14 may include an inlet 17, a valve body 18, an actuator 20, a valve-member assembly 22, a throttling-member assembly 24, a gallery 26, and a fluid outlet 28. FIG. 1 illustrates a split view of the choke valve 14 that is divided along an outlet axis 30. The portion of the choke valve 14 above the outlet axis 30 is in the fully-closed position, and the portion of the choke valve 14 below the outlet axis 30 is in the fully-open position. As explained below with reference to FIG. 2, the actuator 20 may modulate flow between the inlet 17 and the outlet 28 by adjusting the position of the valve-member assembly 22 relative to the throttling-member assembly 24. As described below with reference to FIG. 3, the throttling-member assembly 24 may include flow-impeding recesses that slow fluid flow as the choke valve 14 is initially opened. This slowing of the fluid flow is believed to increase the rangeability of the choke valve 14.

The illustrated inlet 17 includes a generally frustoconical portion 32 and a generally right-circular-cylindrical portion 34 (hereinafter "cylindrical portion," which is not to suggest that the term "cylinder" is limited to right-circular cylinders). Both of these volumes 32 and 34 may be generally coaxial with an inlet axis 36 and may be in fluid communication with the upstream side of the throttling-member assembly 24. The cylindrical portion 34 may have a diameter 38 that is between about ⅛th inch and about 10 inches, e.g., between about 2 inches and about 5 inches.

The body 18 may include an inlet flange 40, an actuator interface 42, and an outlet flange 44. The inlet flange 40 and the outlet flange 44 may include a plurality of bolt openings 46 and 48, respectively, for securing the choke valve 14 to upstream or downstream components. The inlet flange 40 and the outlet flange 44 may also include annular grooves 49 for housing seals. The seals may be biased against upstream or downstream components by bolts extending through the bolt openings 46 and 48. The actuator interface 42 may include a plurality of threaded bolt openings 50 for securing the actuator 20 and a main opening 52 through which the actuator 20 extends to manipulate the valve-member assembly 22. The valve body 18 may be made of a variety of materials, such as a low-alloy steel or other appropriate materials.

The illustrated actuator 20 is a manual actuator that includes a wheel 54, a threaded opening 56, a threaded bushing 58, a shaft 60, and bearings 62. Each of these components 54, 56, 58, 60, and 62 may be generally coaxial with the outlet axis 30. The wheel 54 may be configured to rotate about the outlet axis 30 on the bearings 62, thereby driving engagement of the threaded opening 56 with the threaded bushing 58 and axially pushing or pulling the shaft 60. Other embodiments may include other types of actuators 20, e.g., an electric actuator, a hydraulic actuator, or a pneumatic actuator. The shaft 60 may couple to the valve-member assembly 22 and move the valve-member assembly 22 as the wheel 54 is rotated. Details of the valve-member assembly 22, the throttling-member assembly 24, and the gallery 26 are described below with reference to FIG. 2.

The outlet 28 may include a generally frustoconical portion 64 and a generally right-circular-cylindrical portion 66 (hereinafter cylindrical portion 66). Both of these volumes 64 and 66 may be generally coaxial with the outlet axis 30 and may be in fluid communication with the downstream side of the throttling-member assembly 24.

Figure 2:
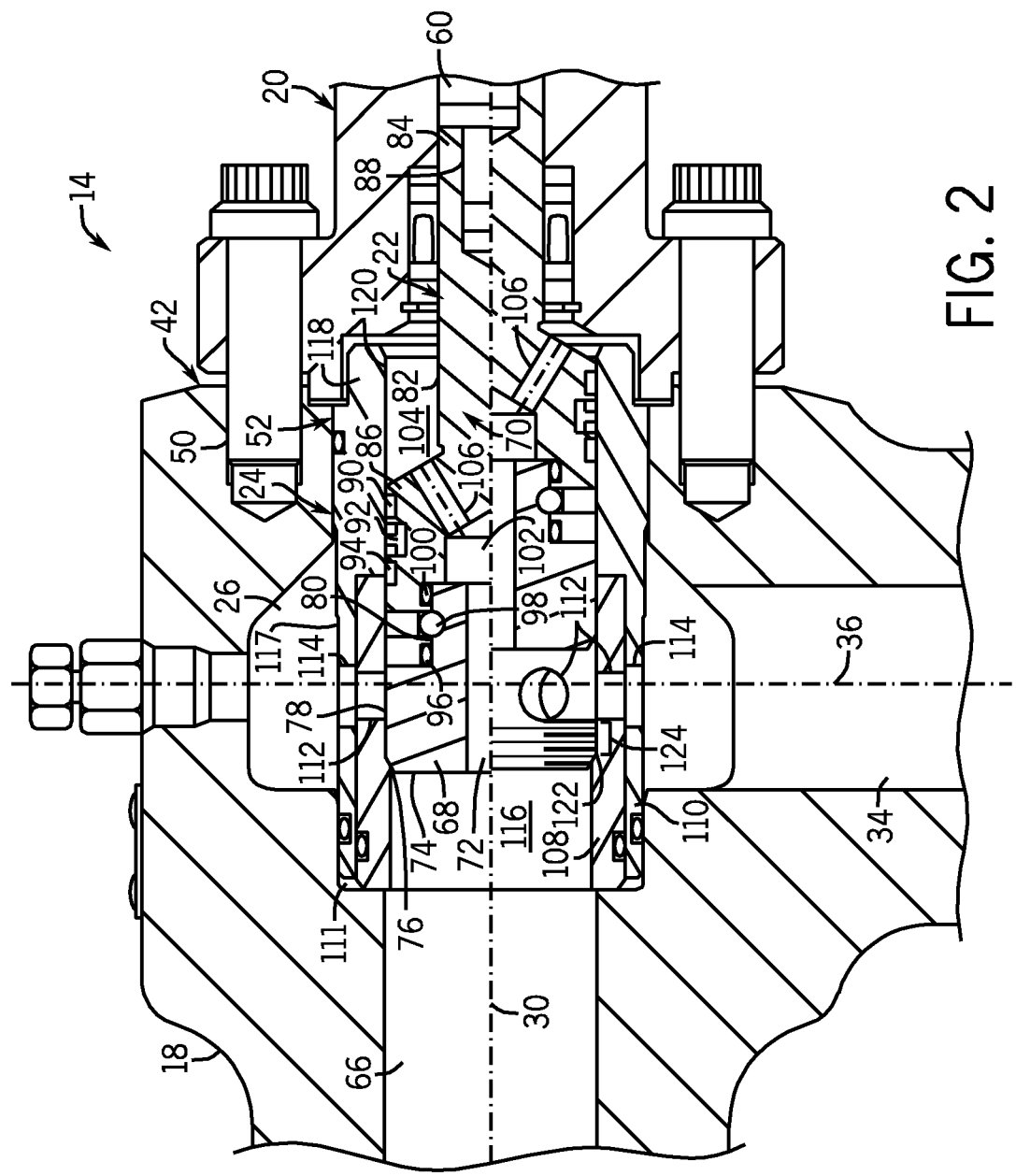
FIG. 2 illustrates an embodiment of a choke valve.

FIG. 2 illustrates additional details of the valve-member assembly 22, the throttling-member assembly 24, and the gallery 26. The illustrated valve-member assembly 22 includes a valve member 68 and an actuator linkage 70. The valve member 68, in this embodiment, is a plug, but other embodiments may have other types of valve members. The illustrated valve member 68 includes an opening 72, a distal face 74, a sealing surface 76, a sidewall 78, and a linkage interface 80. The illustrated valve member 68 and its features 72, 74, 76, 78, and 80 are generally coaxial with the outlet axis 30. The opening 72 generally defines a right-circular-cylindrical volume, and the distal face 74 generally defines the area between concentric circles. The sealing surface 76 generally defines a frustoconical volume, and the sidewall 78 and linkage interface 80 generally define right-circular-cylindrical volumes. The valve member 68 may be made of tungsten carbide, Stellite (a cobalt-chromium alloy available from Deloro Stellite Company of Goshen, Ind.), or other appropriate erosion resistant materials. In some embodiments, the valve member 68 or other components of the choke valve 14 may include materials of lesser erosion resistance that are coated with erosion resistant materials, such as tungsten carbide or a diamond-type coating material.

The actuator linkage 70, in this embodiment, includes a shaft 82 with a linkage mount 84 and a valve-member mount 86 at opposite ends. Each of these features 82, 84, and 86 is generally coaxial with the outlet axis 30. The linkage mount 84 and the valve-member mount 86 have a generally tubular shape. The linkage mount 84 includes interior threads 88 that mate with the shaft 60.

The valve-member mount 86 includes seals 90, 92, and 94. These seals 90, 92, and 94 form sliding seals against the throttling-member assembly 24. The valve-member mount 86 also includes seals 96, 98, and 100 that form generally static seals against the linkage interface 80 of the valve member 68. The seals 90, 92, 94, 96, 98, and 100 may be made of elastomers or other appropriate materials.

The valve-member mount 86 generally defines an inner volume 102 and an outer volume 104. The inner volume 102 is in fluid communication with the downstream side of the valve member 68 through the opening 72. The inner volume 102 is also in fluid communication with the outer volume 104 through a plurality of angled openings 106. The openings 72 and 106 may cooperate with the inner volume 102 to generally equalize pressure between the outer volume 104 and the downstream side of the valve member 68. Equalizing the pressure is believed to reduce the hydraulic or pneumatic force on the valve member 68 from downstream pressures, as the surface area generating axial loads is reduced to the cross-sectional area of the shaft 82.

The throttling-member assembly 24 includes a throttling member 108 and an outer cage 110. In some embodiments, the throttling member 108 may be referred to as an "inner cage." Both of these components 108 and 110 are generally coaxial with the outlet axis 30. A generally tubular recess 111 in the body 18 may house the throttling member 108 and the outer cage 110. The throttling member 108 and the outer cage 110 may be made of tungsten carbide, Stellite, or other appropriate erosion resistant materials. The illustrated throttling member 108 and the outer cage 110 each include a plurality of openings 112 and 114, respectively. The openings 112 and 114 generally define right-circular cylindrical volumes. The openings 112 and 114 are generally coaxial with each other and extend generally radially from the outlet axis 30 at different positions about the outlet axis 30. The openings 112 and 114 place an interior 116 of the throttling member 108 in fluid communication with the gallery 26 when the choke valve 14 is open. The outer cage 110 may include a thinner portion 117 that overlaps the throttling member 108 and a thicker portion 118 that defines an inner sidewall 120. The inner sidewall 120 may seal against the seals 90, 92, and 94 as they slide. The throttling member 108 includes a seating shoulder 122 and one or more flow-impeding recesses 124. Both of these features 122 and 124 are described below in greater detail with reference to FIG. 3.

As illustrated by FIG. 2, the gallery 26 is a roughly annular volume around the outer cage 110. The gallery 26 extends substantially or entirely around the outer cage 110 and is generally coaxial with the outlet axis 30.

In operation, flow through the choke valve 14 is adjusted by manipulating the actuator 20. As explained above, rotating the wheel 54 (FIG. 1) causes the shaft 60 to translate axially, along the outlet axis 30. This movement drives the valve member 68 between the fully-open and fully-closed positions illustrated by FIG. 2. By moving the valve member 68, flow through the choke valve 14 may be adjusted.

When fluid enters the choke valve 14, it flows in through the inlet 17 (FIG. 1), along the cylindrical portion 34, and into the gallery 26. Once in the gallery 26, the fluid flows around the outer cage 110 and through one of the plurality of openings 114 and 112 (FIG. 2).

The flow rate through the choke valve 14 depends on the position of the valve member 68. The openings 112 may be partially or substantially entirely obstructed by the valve member 68, thereby impeding a portion of the flow, and if the sealing surface 76 is biased against the seating shoulder 122, the valve member 68 may impede or stop substantially all flow through the choke valve 14. If the valve member 68 is moved a short distance away from the seating shoulder 122, such that the openings 112 are still obstructed, a relatively small amount of fluid may flow through the openings 114 and 112, along the sidewall 78 of these valve member 68, past the flow-impeding recesses 124, and into the cylindrical portion 66 that leads to the outlet 28 (FIG. 1). As explained further below with reference to FIG. 3, the flow path along the flow-impeding recesses 124 may reduce the flow rate in this portion of the valve member's stroke. If the valve member 68 is shifted even further toward the open position, such that the sidewall 78 of the valve member 68 does not overlap the openings 112, fluid may flow even more quickly through the openings 112 and 114 into the interior 116 of the throttling-member assembly 24 and out through the outlet 28 (FIG. 1). Thus, by shifting the position of the valve member 68, flow through the choke valve 14 is adjusted.

Figure 3:
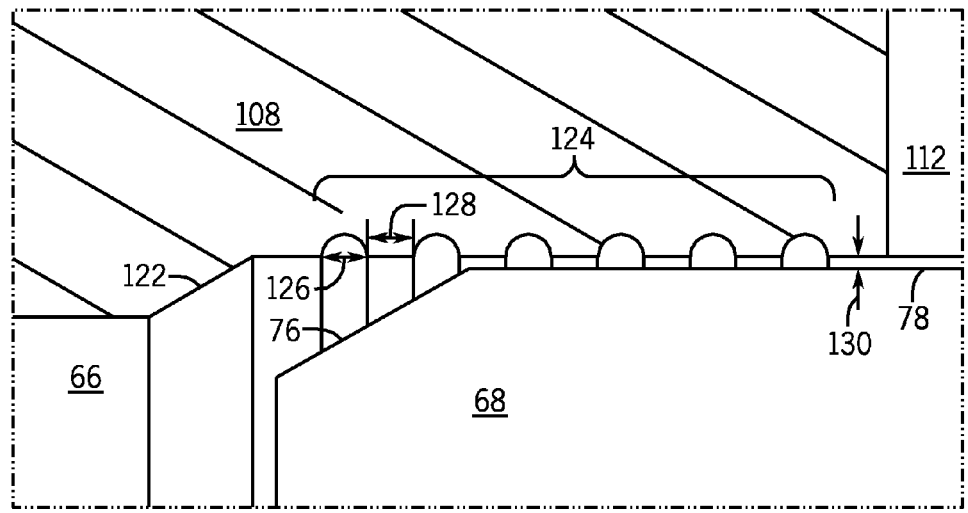
FIG. 3 illustrates an embodiment of a throttling member with flow-impeding recesses.

FIG. 3 illustrates additional details of the flow-impeding recesses 124. The flow-impeding recesses 124 may each be a generally annular recess in the throttling member 108. As such, the illustrated flow-impeding recesses 124 may be referred to as grooves. In other embodiments, the flow-impeding recesses may coil around the throttling member 108 in a manner similar to a machine thread. The illustrated flow-impeding recesses 124 have a generally semicircular profile, e.g., a profile of about 180 degrees of a circle. The flow-impeding recesses 124 may have a diameter 126 that is between about 0.5 mm and about 4 mm, e.g., between about 0.8 mm and about 1.2 mm or about 1 mm. In other embodiments, the flow-impeding recesses 124 may have a profile that is a greater or smaller portion of a circle, e.g., an arc, or a profile with some other shape, such as those described below with reference to FIG. 4. Each flow-impeding recess 124 may have a generally similar profile to the other flow-impeding recesses 124, or they may have different profiles, such as in the embodiment described below with reference to FIG. 6.

There may be a gap 128 between each of the flow-impeding recesses 124. The gap 128 may be generally equal to the width 126 of the flow-impeding recesses 124, or the gap 128 may be greater than or less than the diameter 126. In some embodiments, the gap 128 may increase or decrease along the outlet axis 30 (FIG. 2), such as in the embodiment described below with reference to FIG. 6, or it may be generally uniform along this direction.

FIG. 3 also illustrates an annular gap 130 between the sidewall 78 of the valve member 68 and the throttling member 108. The gap 130 may be between about 0.5 thousandths of an inch and about 10 thousandths of an inch, e.g., between about 1 thousandths of an inch and about 4 thousandths of an inch, or about 2.5 thousandths of an inch. In some embodiments, the gap 130 may be manufactured to be among the smaller portion of these ranges by machining the valve member 68 and the throttling member 108 as a matched pair. The size of the gap 130 may vary along the direction of movement of the valve member 68, e.g., the valve member 68, the throttling member 108, or both may be tapered.

FIG. 3 illustrates the valve member 68 in a low-flow mode of operation. In this mode, the sealing surface 76 is spaced away from the seating shoulder 122, but the sidewall 78 still overlaps the opening 112. Fluid flows through the opening 112, into the gap 130, around the valve member 68, and into the cylindrical portion 66 that leads to the fluid outlet 28 (FIG. 1). In some conventional designs, this flow is relatively large once the contact between the sealing surface 76 and the seating shoulder 122 is broken. The flow-impeding recesses 124, however, are believed to disrupt this flow and decrease the flow rate when the valve member 68 is in the low-flow mode of operation. As the the flow passes through the gap 130, it repeatedly expands and contracts as it enters and exits each of the flow-impeding recesses 124. This expansion and contraction throttles the flow, impeding sudden jumps in flow rate as the seal is broken. As the valve member 68 slides towards the open position and fewer flow-impeding recesses 124 are disposed adjacent the sidewall 78, and the throttling effect of the flow-impeding recesses 124 is gradually decreased, and as the flow passes by fewer flow-impeding recesses 124, the flow rate increases. Thus, the flow-impeding recesses 124 are believed to decrease the rate at which the flow rate increases as the valve member 68 moves, thereby increasing the rangeability of the choke valve 14.

Figure 4:
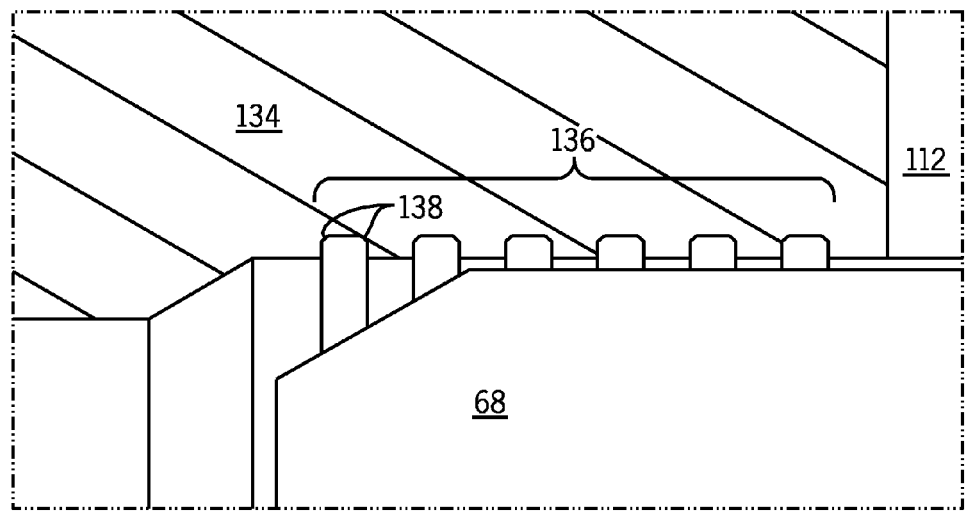
FIG. 4 illustrates a second embodiment of a throttling member with flow-impeding recesses.

FIG. 4 illustrates another embodiment of a throttling member 134. The illustrated throttling member 134 is similar to the previously-described throttling member 108 (FIGS. 2 and 3), except that the throttling member 134 includes a plurality of flow-impeding recesses 136 that are differently shaped from those described above. The illustrated flow-impeding recesses 136 have a generally annular shape with a generally rectangular cross-section. The corners of the cross-section 138 are chamfered to reduce stress concentrations. The flow-impeding recesses 136 may also be referred to as grooves. The flow-impeding recesses 136 may have a variety of different cross-sectional shapes, including a generally oval cross-sectional shape, a generally elliptical cross-sectional shape, a generally triangular cross-sectional shape, a generally square cross-sectional shape, a generally trapezoidal cross-sectional shape, or other shapes or combinations of shapes.

Figure 5:
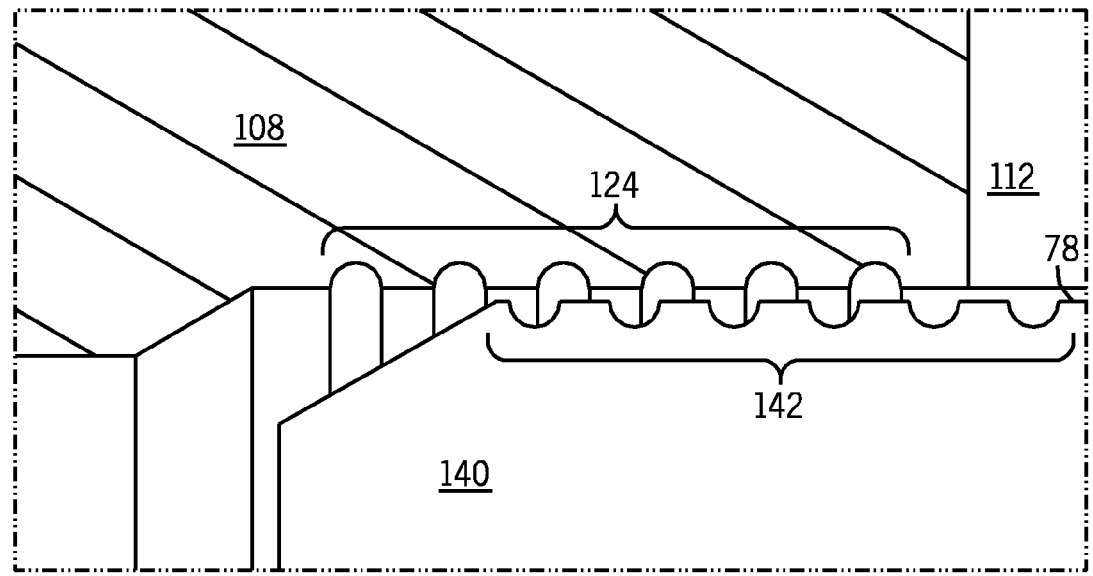
FIG. 5 illustrates an embodiment of a valve-member with flow-impeding recesses.

FIG. 5 illustrates another embodiment of a valve member 140 in the choke valve 14 of FIGS. 2 and 3. The illustrated valve member 140 includes a plurality of flow-impeding recesses 142. The flow-impeding recesses 142 define generally annular recesses in the sidewall 78 of the valve member 140. The flow-impeding recesses 142 may have generally the same size and shape as the flow-impeding recesses 124, or they may have different shapes. The illustrated flow-impeding recesses 142 have a generally semicircular cross-section, but other embodiments may have different shapes, such as those mentioned above.

Figure 6:
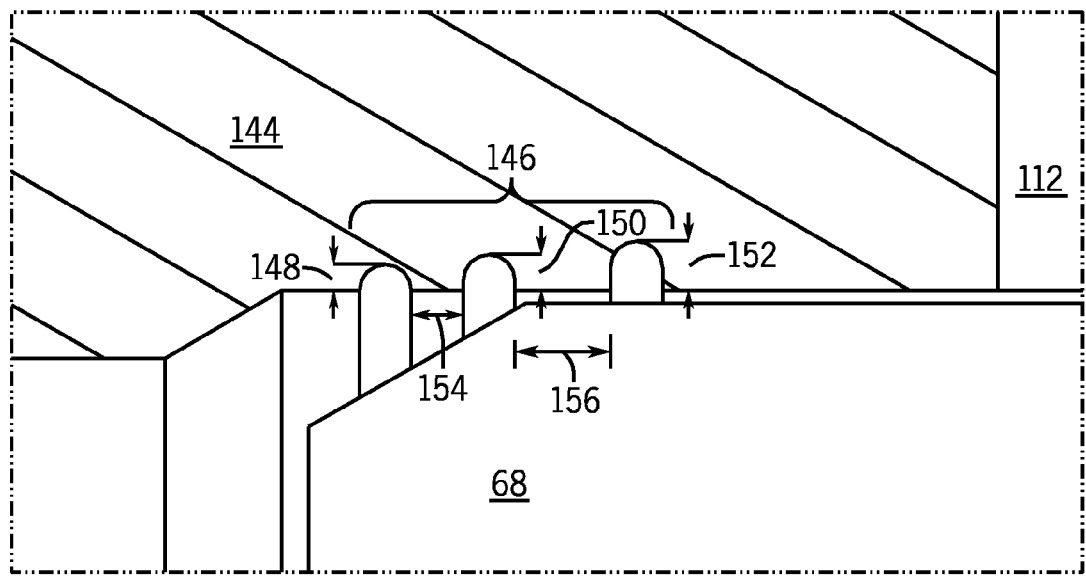
FIG. 6 illustrates a third embodiment of a throttling member with flow-impeding recesses.

FIG. 6 illustrates another embodiment of a throttling member 144. The illustrated throttling member 144 includes a plurality of flow-impeding recesses 146 that have different depths 148, 150, and 152 relative to one another. In this embodiment, the depths 148, 150, and 152 increase in the direction that the valve member 68 moves when opening, but in other embodiments, the depths 148, 150, and 152 may increase in the other direction or be generally uniform. The distances 154 and 156 between flow-impeding recesses 146 also increase in the opening direction, but in other embodiments, they may increase in the other direction or be generally uniform. The depths 148, 150, and 152 and the widths 154 and 156 may be selected to tune the flow rate at different positions of the valve member 68. For example, grooves 146 may be placed relatively close to each other upstream of regions where a smaller increase in flow rate for a given amount of valve member 68 movement is desired, and the grooves 146 may be spaced further apart from one another upstream of regions where a greater increase in flow rate as the valve member 68 moves is desired.

Figure 7:
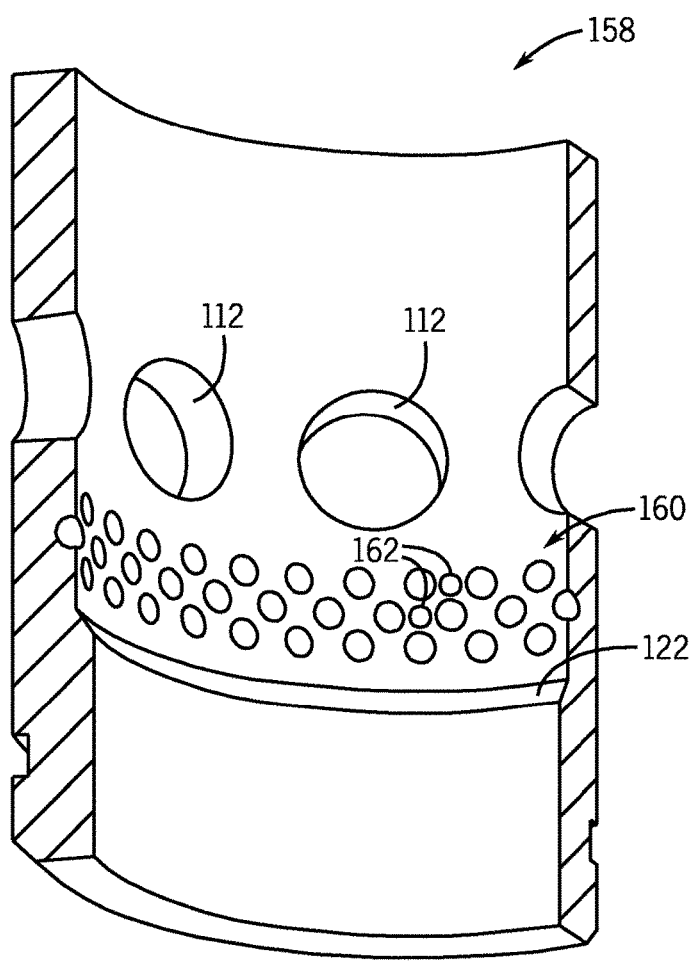
FIG. 7 illustrates a fourth embodiment of a throttling member with flow-impeding recesses.

FIG. 7 illustrates another embodiment of a throttling member 158. FIG. 7 illustrates a sectioned perspective view of the throttling member 158. As illustrated, the throttling member 158 includes a plurality of flow-impeding recesses 160. The illustrated flow-impeding recesses 160 are generally hemispherical recesses of generally uniform dimensions, but other embodiments may include flow-impeding recesses 160 with varying dimensions or other shapes, e.g., smaller or larger portions of a sphere, frustoconical or conical recesses, or recesses generally defining a parallelepiped volume, such as a cube. The illustrated flow-impeding recesses 160 may be referred to as dimples. The flow-impeding recesses 160 are generally arranged in a hexagonal lattice, but other embodiments may include recesses 160 arranged differently, e.g., in a rectangular lattice or irregular lattice. Some embodiments may include combinations of the flow-impeding recesses 160 and the previously-described flow-impeding recesses 124 (FIG. 3), 136 (FIG. 4), 142 (FIG. 5), or 146 (FIG. 6). In some embodiments, the spaces between the recesses 162 may be occupied with smaller flow-impeding recesses to increase the number of recesses. In some embodiments, the flow-impeding recesses 160 may be formed by increasing the surface roughness of the throttling member 158. For example, the surface of the throttling member 158 may be knurled with a cross-cut pattern to introduce turbulence in the flow and provide flow disruption. The flow-impeding recesses 160 are not limited to discrete dimples and may include a wide variety of different variations in the surface geometry of the throttling member 158.

Figure 8:
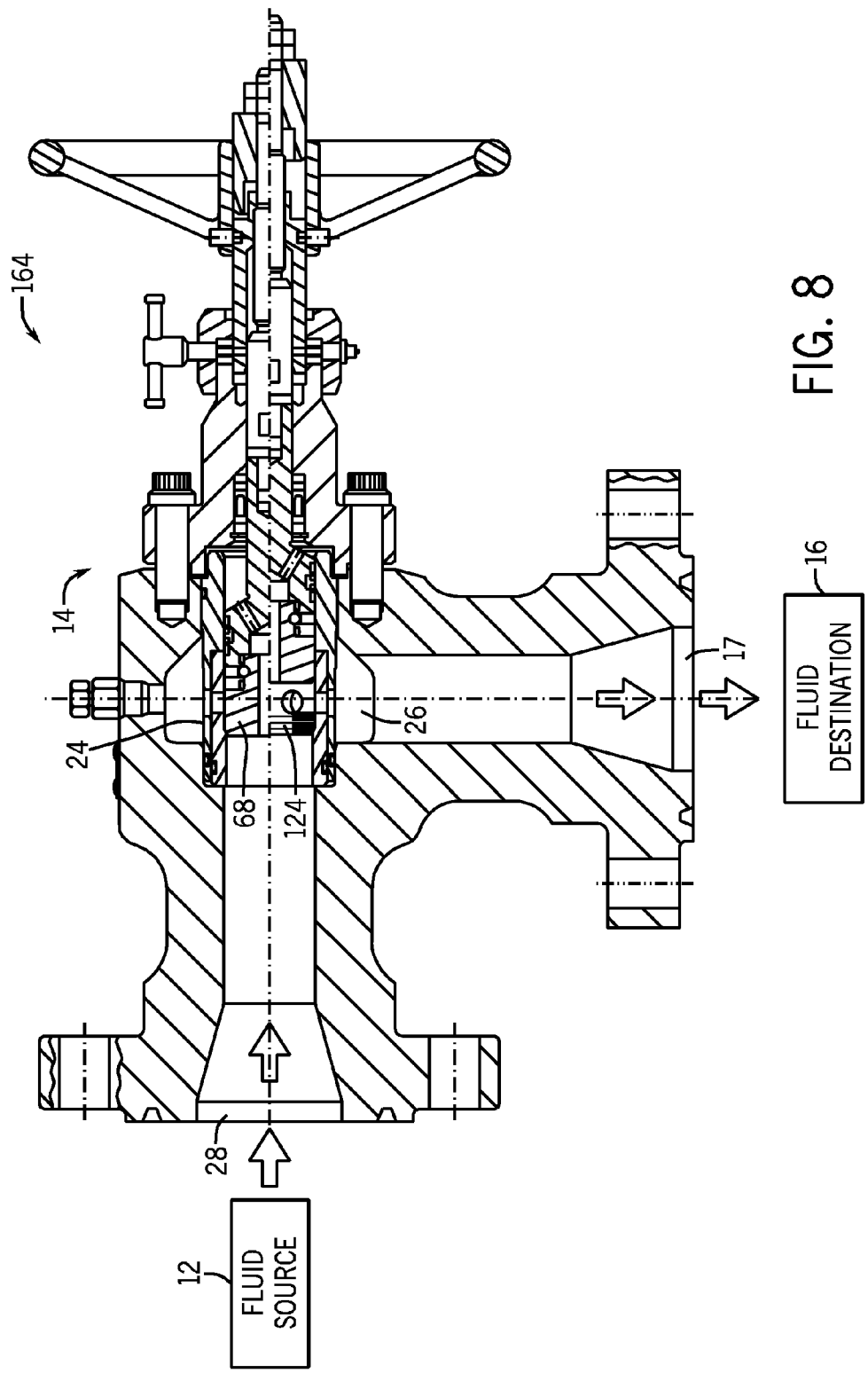
FIG. 8 illustrates a second embodiment of a fluid-handling system.

FIG. 8 illustrates another embodiment of a fluid-handling system 164. The illustrated fluid-handling system 164 includes the previously-described fluid source 12, choke valve 14, and fluid destination 16. In this embodiment, though, the direction of flow is reversed. The fluid source 12 is coupled to what was previously the outlet 28 of the choke valve 14 (FIG. 1), and the fluid destination 16 is coupled to what was previously the fluid inlet 17 (FIG. 1). In this embodiment, the fluid flows first over the valve member 68 before flowing through the throttling-member assembly 24, into the gallery 26, and exiting the choke valve 14. As with the previous embodiment, as the fluid flows past a partially open valve member 68, flow-impeding recesses 124 (FIG. 3), 136 (FIG. 4), 142 (FIG. 5), 146 (FIG. 6), or 174 (FIG. 10) may slow the flow of the fluid.

Figure 9:
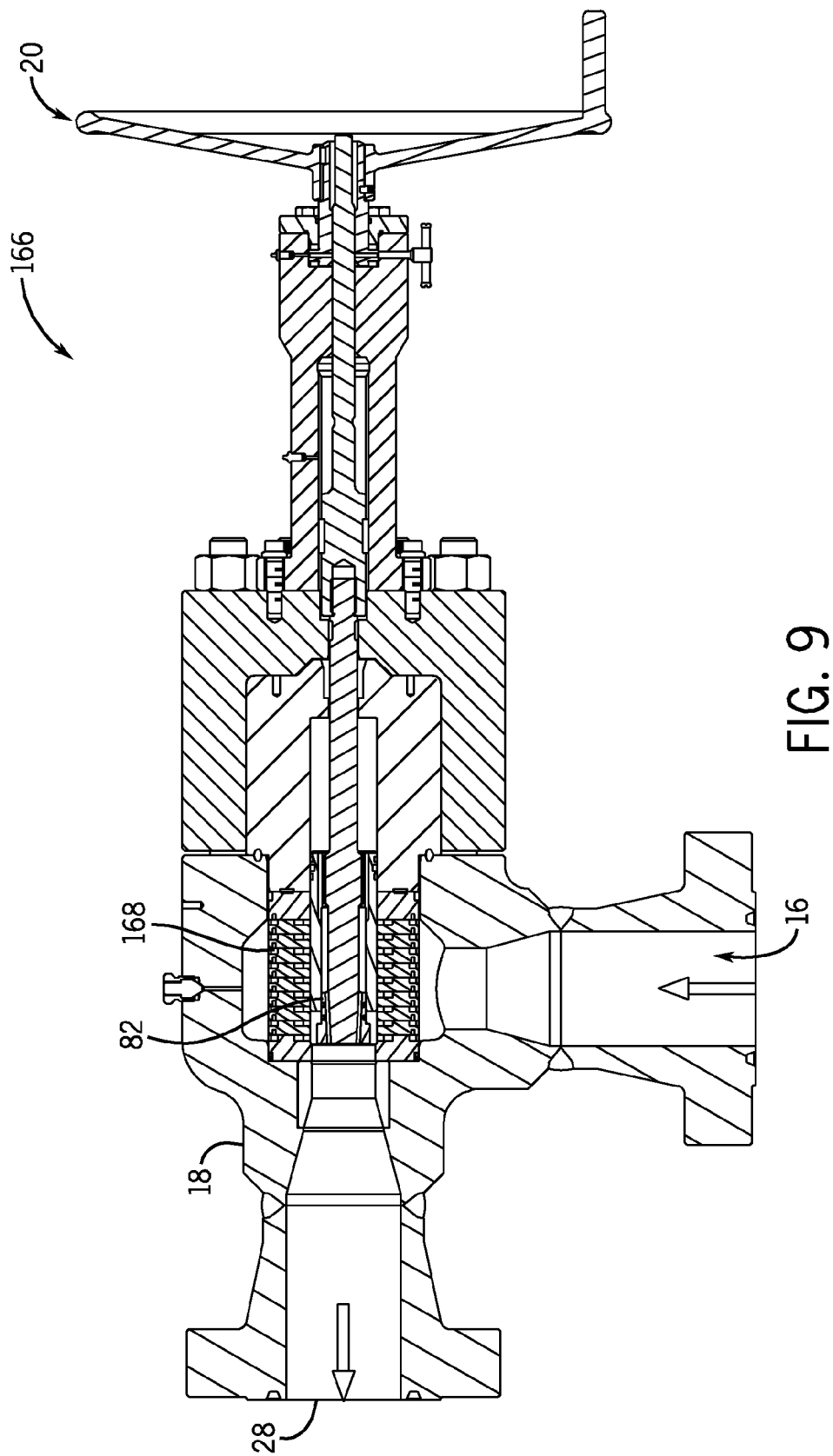
FIG. 9 illustrates a fifth embodiment of a throttling member with flow-impeding recesses.

FIG. 9 illustrates another embodiment of a choke valve 166, which may be used in either of the fluid-handling systems 10 (FIG. 1) or 164 (FIG. 8). The components of the choke valve 166 are generally similar to those of the choke valve 14 (FIG. 1) described above, except that the choke valve 166 includes a throttling-member assembly 168 that functions as a trim to relatively gradually lower the pressure of fluids flowing through the choke valve 166, including when the choke valve 166 is fully-open. As such, the throttling-member assembly 168 may be referred to as a trim.

Figure 10:
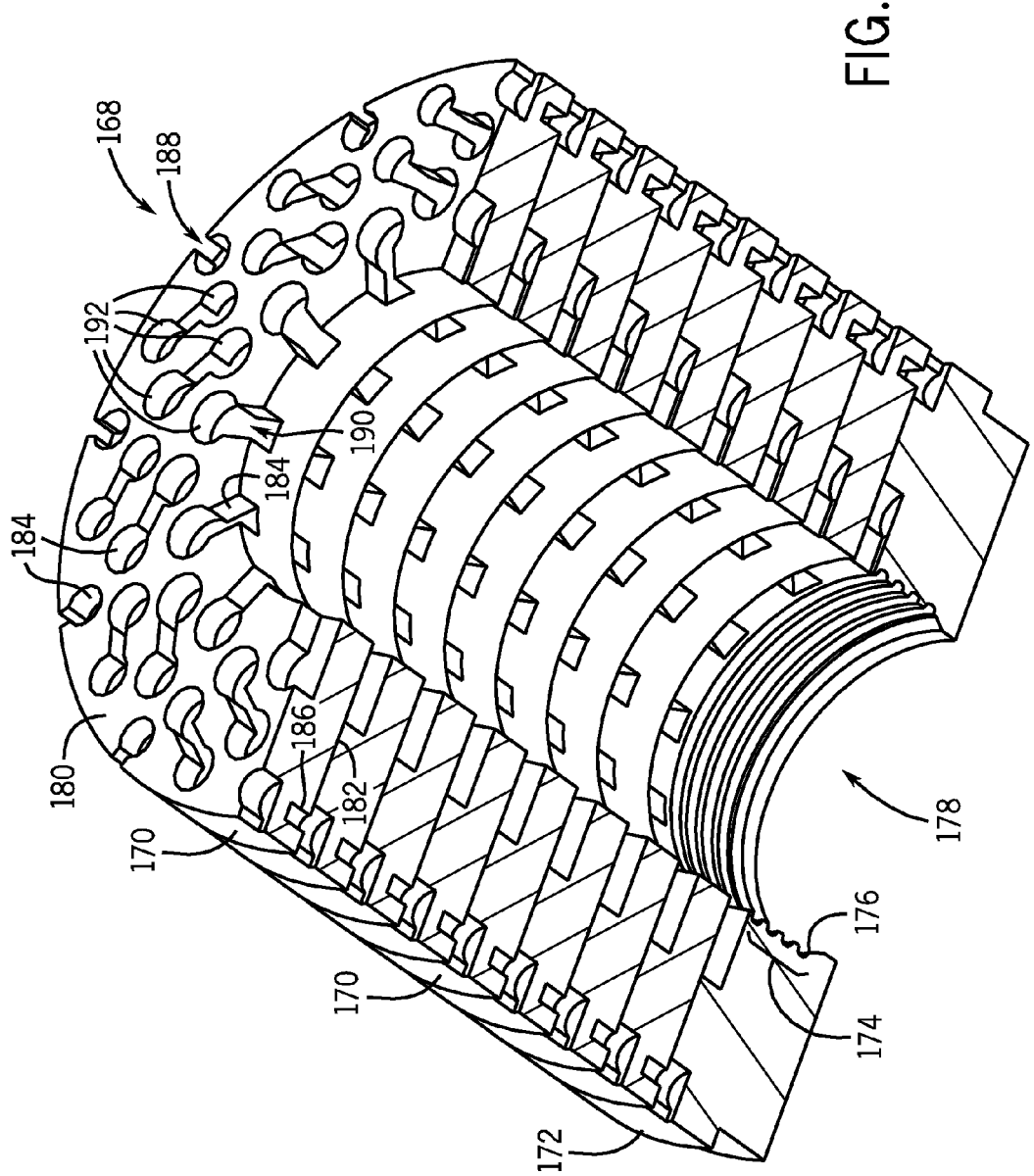
FIG. 10 illustrates details of the throttling member of FIG. 9.

Details of the throttling-member assembly 168 are shown in a cross-sectional view of FIG. 10. As illustrated, the throttling-member assembly 168 includes a plurality of plates 170 stacked on a base plate 172. The base plate 172 includes a plurality of flow-impeding recesses 174 disposed adjacent a seating shoulder 176 in an interior 178 of the throttling-member assembly 168. The flow-impeding recesses 174 may include any of the previously-described flow-impeding recesses 124 (FIG. 3), 136 (FIG. 4), 142 (FIG. 5), 146 (FIG. 6), or 174 (FIG. 10).

Each of the plates 170 is generally similar to the other plates 170. Each illustrated plate occupies a generally annular volume. The plates 170 include a top 180 and a bottom 182 with different groups of passages 184 and 186, respectively. The passages 184 on the top 180 of one plate 170 may interface with the passages 186 on the bottom 182 of an adjacent plate 172, thereby forming a tortuous path between an inlet 188 and an outlet 190. Each of these paths may include expansion zones 192 that are of increasing size between the inlet 188 and the outlet 190. The expansion zones 192 may have a generally right-circular-cylindrical shape. Each of the expansion zones 192 may be joined to the next upstream expansion zone 192 through either the passages 184 along the top 180 of the plates 170 or the passages 186 along the bottom 182 of the adjacent plate 170.

In operation, a fluid flowing at relatively high flow rates (e.g., when the valve member 68 is recessed beyond of the flow-impeding recesses 174 in a high-flow mode of operation) may be slowed by the tortuous path through the plates 170. When the valve member 68 is closer to the closed position, in the low-flow mode of operation, the grooves 174 may slow the flow rate through the throttling-member assembly 168 in a manner similar to that of the previously-described flow-impeding recesses 124 (FIG. 3), 136 (FIG. 4), 142 (FIG. 5), 146 (FIG. 6), or 174 (FIG. 10). The flow-impeding recesses 174 may extend the rangeabilty of the choke valve 166 (FIG. 9) to lower flow rates, and the tortuous paths through the plates 170 may extend the rangeabilty through higher flow rates.

Figure 11:
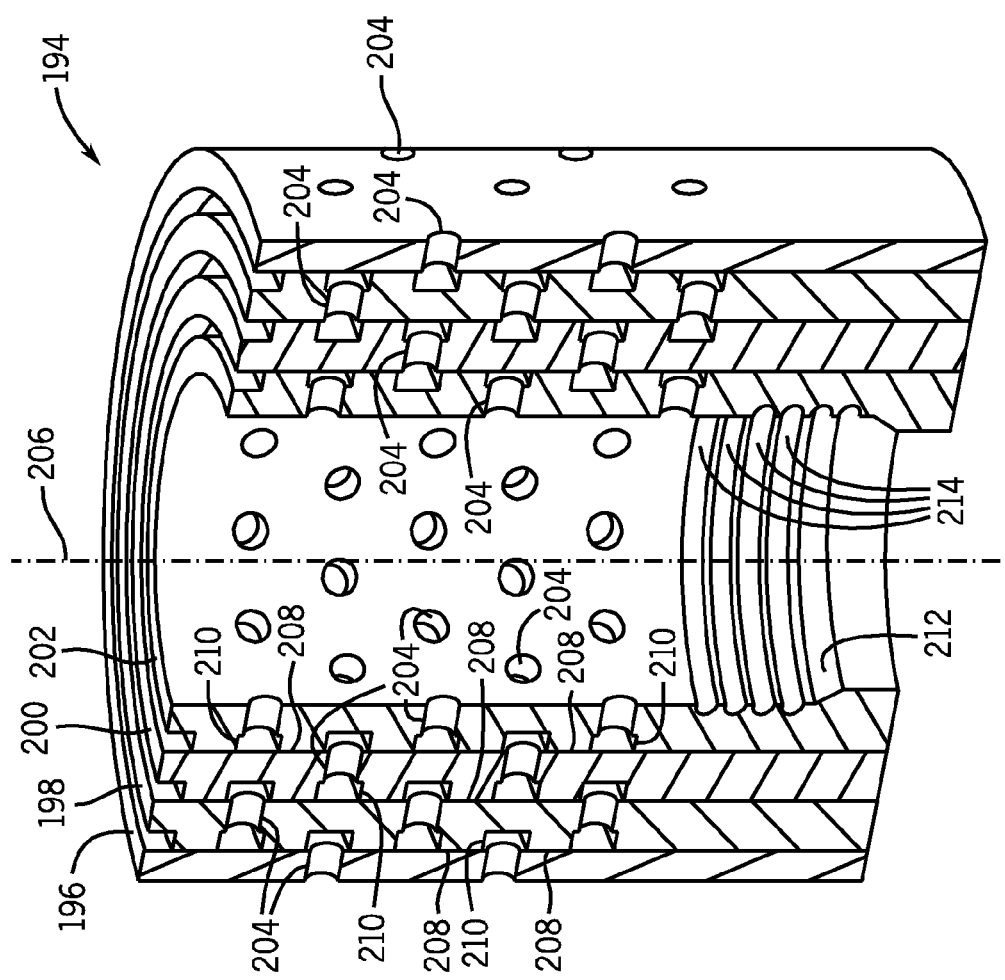
FIG. 11 illustrates a sixth embodiment of a throttling member with flow-impeding recesses.

FIG. 11 illustrates another embodiment of a throttling member 194, which may be employed in the choke valve 166 of FIG. 9. The throttling member 194 includes four coaxial cages 196, 198, 200, and 202. Each of the cages 196, 198, 200, and 202 includes a plurality of openings 204. The openings 204 define generally right-circular-cylindrical volumes that extend generally radially about a central axis 206. In other embodiments, the openings 204 may have other shapes and may extend through the cages 196, 198, 200, or 202 at other angles. The openings 204 are generally arranged in a hexagonal lattice around each of the cages 196, 198, 200, and 202, but in other embodiments, the openings 204 may be arranged differently, e.g., in a square lattice. The openings 204 through the cages 196 and 200 are misaligned with the openings 204 through the cages 198 and 202 to form a tortuous flow path through the throttling member 194. The cages 198, 200, and 202 include annular ribs 208 that hold the cages in spaced relation and define grooves 210. Fluid may flow through the grooves 210 to reach the misaligned openings 204 through adjacent cages 198, 200, and 202.

The illustrated inner cage 202 includes a seating shoulder 212 and flow-impeding recesses 214. The previously-described valve members 68 (FIG. 1) or 140 (FIG. 5) may translate through the inner cage 202 and seal against the sealing shoulder 212. The flow-impeding recesses 214 may be disposed adjacent the sealing shoulder 212 along the interior of the inner cage 202. The flow-impeding recesses 214 may include any of the previously-described flow-impeding recesses 124 (FIG. 3), 136 (FIG. 4), 142 (FIG. 5), 146 (FIG. 6), or 174 (FIG. 10). The flow-impeding recesses 214 may extend the rangeabilty of the choke valve 166 (FIG. 9) to lower flow rates, and the tortuous paths through the cages 196, 198, 200, and 202 may extend the rangeabilty through higher flow rates.

Figure 12:
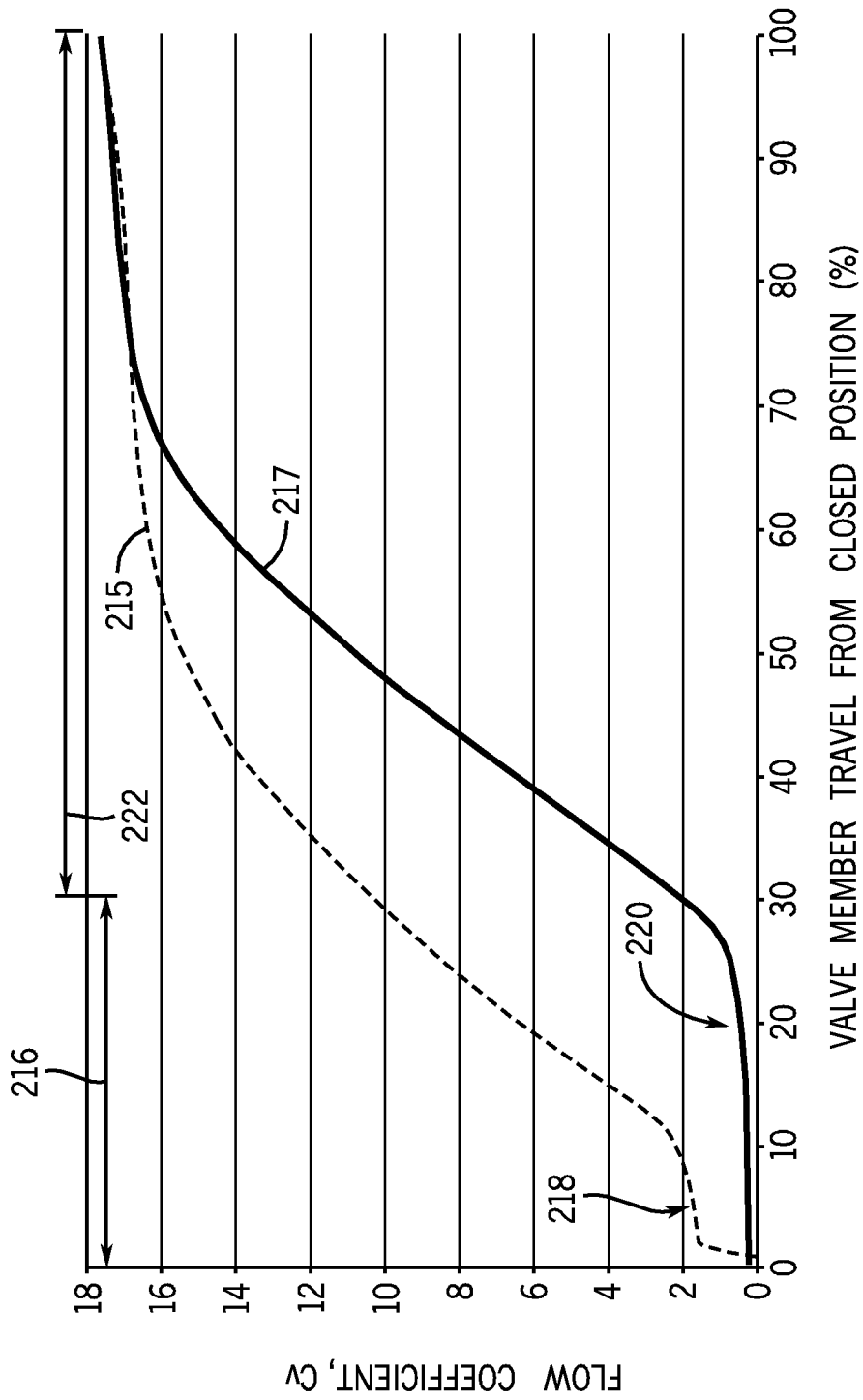
FIG. 12 is a graph of flow coefficient versus valve member position for systems with and without flow-impeding recesses.

FIG. 12 is a graph illustrating flow coefficient Cv versus valve-member position for both a conventional choke valve 215 and a choke valve 217 with flow-impeding recesses. The ordinate of FIG. 12 represents the percentage of the valve-members stroke from the closed position, and the abscissa represents the flow coefficient that the choke valves are believed to exhibit. As illustrated, in a low-flow mode of operation 216, the conventional choke valve relatively rapidly steps 218 to a higher flow coefficient. In contrast, the choke valve with flow-impeding recesses gradually increases flow coefficient 220 when in a low-flow mode of operation 216. The flow-impeding grooves are believed to increase the portion of the valve member's stroke in which the flow rate is controllable, thereby increasing rangeability.

The choke valves 14 (FIG. 2), 166 (FIGS. 9), and 217 (FIG. 12) described above may be characterized as multi-stage choke valves, having one stage (or stages) formed by the passages through the throttling member from the gallery and another stage (or stages) formed by the flow-impeding recesses. The passages through the throttling member may throttle flow at relatively high flow rates, thereby providing a relatively high upper flow coefficient capacity, and the flow-impeding recesses may throttle flow at relatively low flow rates, thereby providing flow control at relatively low flow rates. When the valve member is retracted beyond the flow-impeding recesses, the choke valves may function with one fewer stage, e.g., as a single-stage choke valves.

The stage formed by the flow-impeding recesses may be relatively robust to blockages from material flowing through the above-described choke valves. If debris becomes entangled in the flow-impeding recesses, the valve member may be retracted, and the resulting increase in flow through the choke valve may clear the blockages. In some embodiments, the pressure drop across the choke valve may be monitored, and if an increase in the pressure drop is detected, the choke valve may be opened to clear any blockages that might have caused the increase in pressure change. Similar action may be taken in response to a decrease in flow rate through the choke valve. Clearing blockages is believed to potentially reduce maintenance costs and increase reliability of the aforementioned choke valves.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A device, comprising:
   a choke valve, comprising:
      a generally tubular throttling member comprising:
         a sealing shoulder disposed in an inner volume of the throttling member;
         a plurality of radial openings configured to convey a fluid between the inner volume of the throttling member and an outer volume of the throttling member; and
         a plurality of flow-impeding recesses disposed between the sealing shoulder and the plurality of radial openings in the inner volume of the throttling member; and
      a valve member disposed at least partially in the inner volume of the throttling member.

2. The device of claim 1, wherein the plurality of flow-impeding recesses are different from one another or the plurality of flow-impeding recesses have a non-uniform arrangement.

3. The device of claim 1, wherein the plurality of flow-impeding recesses comprises a plurality of generally annular grooves.

4. The device of claim 3, wherein the each of the plurality of generally annular grooves has a generally semicircular cross-section.

5. The device of claim 1, wherein the each of the plurality of flow-impeding recesses has a width between about 0.2 mm and about 5 mm.

6. The device of claim 1, wherein the plurality of flow-impeding recesses comprise a plurality of dimples.

7. The device of claim 1, wherein the plurality of flow-impeding recesses comprise grooves of differing depth.

8. The device of claim 1, wherein the plurality of flow-impeding recesses comprises flow-impeding recesses spaced away from one another by differing distances.

9. The device of claim 1, wherein the plurality of flow-impeding recesses comprise grooves of generally equal depth that are spaced away from one another by a generally uniform distance.

10. The device of claim 1, wherein the valve member comprises another plurality of flow-impeding recesses.

11. The device of claim 1, wherein the generally tubular throttling member comprises a plurality of generally concentric cages.

12. The device of claim 1, wherein the generally tubular throttling member comprises a plurality of plates that form passages configured to throttle a fluid flowing between the plates.

13. The device of claim 1, comprising a fluid source coupled to the choke valve, wherein the fluid source comprises an oil or natural gas well, a pipeline, a tanker, an upstream choke valve, upstream components of a processing plant, an energy-acquisition system, or a combination thereof.

14. A device, comprising:
a throttling member configured to seal against a valve member in a choke valve, wherein the throttling member comprises:
a wall extending about an axis to define an inner volume;
a plurality of radial openings extending through the wall into the inner volume;
a sealing shoulder; and
a plurality of flow-impeding recesses disposed along an inner surface of the wall, wherein the plurality of flow-impeding recesses are disposed axially between the sealing shoulder and the plurality of radial openings.

15. The device of claim 14, wherein the plurality of flow-impeding recesses are disposed adjacent the sealing shoulder.

16. The device of claim 14, wherein the wall comprises a generally tubular cage, and the plurality of radial openings are circumferentially spaced apart from one another circumferentially about the axis of the generally tubular cage.

17. The device of claim 14, wherein the plurality of flow-impeding recesses are circumferentially spaced apart from one another circumferentially about the axis of the wall.

18. The device of claim 14, wherein the throttling member comprises a plurality of plates defining a plurality of passages.

19. The device of claim 14, wherein the plurality of flow-impeding recesses comprises a plurality of grooves or a plurality of dimples.

20. A device, comprising:
a choke valve comprising:
a generally tubular cage comprising:
a seating shoulder;
a plurality of flow-impeding recesses in an inner sidewall of the cage near the seating shoulder; and
a plurality of radial openings extending between the inner sidewall of the cage and an outer sidewall of the cage, wherein the plurality of openings are disposed on an opposite side of the plurality of flow-impeding recesses from the seating shoulder; and
a plug disposed at least partially in the cage, wherein the plurality of flow-impeding recesses are configured to disrupt a fluid flow through a gap between the plug and the inner sidewall of the cage.

21. The device of claim 20, wherein the device comprises an actuator coupled to the plug.

22. The device of claim 20, wherein the plurality of flow-impeding recesses comprise a plurality of generally annular grooves.

* * * * *